US006972894B2

(12) United States Patent
Bjarklev et al.

(10) Patent No.: US 6,972,894 B2
(45) Date of Patent: Dec. 6, 2005

(54) OPTICAL WAVELENGTH CONVERTER

(75) Inventors: Anders Bjarklev, Roskilde (DK); Jes Broeng, Lyngby (DK); Stig Eigil Barkou Libori, Gentofte (DK)

(73) Assignee: Crystal Fibre A/S, Birkerod (DK)

( * ) Notice: Subject to any disclaimer, the term of this patent is extended or adjusted under 35 U.S.C. 154(b) by 200 days.

(21) Appl. No.: 10/333,920

(22) PCT Filed: Aug. 10, 2001

(86) PCT No.: PCT/DK01/00534

§ 371 (c)(1),
(2), (4) Date: Jul. 2, 2003

(87) PCT Pub. No.: WO02/14944

PCT Pub. Date: Feb. 21, 2002

(65) Prior Publication Data

US 2004/0100681 A1    May 27, 2004

(30) Foreign Application Priority Data

Aug. 11, 2000   (DK) ............................... 2000 01210

(51) Int. Cl.⁷ ........................... G02F 1/365; G02B 6/20
(52) U.S. Cl. ..................... 359/332; 385/122; 385/123; 385/125; 385/129
(58) Field of Search ............................. 359/326–332; 385/123, 125, 126, 129, 131, 142, 144, 122

(56) References Cited

U.S. PATENT DOCUMENTS

| 5,028,107 A | 7/1991 | Bierlein et al. ........... 350/96.12 |
| 5,802,236 A | 9/1998 | DiGiovanni et al. ........ 385/127 |
| 5,907,647 A | 5/1999 | Eggleton et al. ............... 385/28 |
| 6,005,708 A | 12/1999 | Leclerc et al. ............... 359/326 |
| 6,097,870 A * | 8/2000 | Ranka et al. ................ 385/127 |
| 6,208,455 B1 * | 3/2001 | Ueno et al. .................. 359/332 |
| 6,243,522 B1 * | 6/2001 | Allan et al. .................. 385/123 |
| 6,792,188 B2 | 9/2004 | Libori et al. ................. 385/125 |
| 2002/0061176 A1 | 5/2002 | Libori et al. ................. 385/125 |

FOREIGN PATENT DOCUMENTS

| EP | 0 880 054 | 11/1998 | ............ G02F 2/00 |
| WO | 99/64903 | 12/1999 | ............ G02B 6/00 |
| WO | 00/37974 | 6/2000 | ............ G02B 6/02 |

OTHER PUBLICATIONS

Lin et al., "Two-dimensional photonic bandgap optical limiter in the visible," *Optics Letters*, 23(2): 94-96 (1998).
Scholz et al., "Dynamic cross-waveguide optical switching with a nonlinear photonic band-gap structure," *Optics Express*, 3(1): 28-34 (1998).

(Continued)

Primary Examiner—John D. Lee
(74) Attorney, Agent, or Firm—Jacobson Holman PLLC

(57) ABSTRACT

An optical wavelength conversion device including a microstructured optical waveguide, which includes sections with a non-linear material having an index of refraction which changes as a non-linear function of light intensity. The optical waveguide includes a light guiding core region, and is dimensioned for providing spatial overlap between the sections filled with the non-linear material and light propagating within the waveguide. First and second optical light sources may also be included, the second light source having an intensity sufficient to change the refractive index of the non-linear material sufficiently to encode or modulate the light from the first light source through the effect of leaking light from the first light source inside the guiding core to the outside of the guiding core.

17 Claims, 11 Drawing Sheets

OTHER PUBLICATIONS

Shirk et al., "Intensity-dependent transmission protects sensors," *Laser Focus World,* 121-129 (2000).

"Sensors Expo," Advanstar Communications, Inc., (2000).
Stubkjaer et al., "Wavelength Converter Technology," *IEICE Trans. Electron.,* E82-C(2), 338-348 (1999).

* cited by examiner

Fig. VII a: Guided mode (guided)

Fig. VII b: Leaky mode (non-guided)

OPTICAL WAVELENGTH CONVERTER

FIELD OF INVENTION

The present invention relates to optical devices for conversion of optical signals from one wavelength to another, and in particular such devices realised using micro-structured optical waveguides.

BACKGROUND OF THE INVENTION

Wavelength division multiplexing (WDM) is considered one of the most feasible ways to upgrade point-to-point transmission links and to meet the huge demand for transmission capacity in telecommunication systems. As the network technology evolves, it will become important for reconfiguration purposes to be able to perform wavelength conversion or translation within the network or at its interfaces. In order to meet the transmission capacity demands of future optical systems it will be important to make all-optical wavelength converters, and recent research have focussed on various means of providing such functionality (for a review see Stubkjaer et al. IEICE Trans. Electron. Vol. E82-C, No. 2, February 1999). The focus in the research has been on wavelength conversion on binary signal formats that are by far dominant for telecommunication traffic today. As described by Stubkjaer et al., the converters fall into four groups: The first is opto-electronic converters, which consists of a detector followed by amplification or regeneration and transmitter stages. For present and future high-speed communication links (operating at bit rates at 10 Gbit/s or more), the power consumption of the opto-electronic converter will be high and bandwidth limitations of electronic circuitry are likely to be encountered. A second group of converters includes the laser converters that are working by optical control of single frequency lasers through the effect of an input signal launched into the laser causing gain saturation, which in term controls the oscillation of the laser. The intensity modulated (IM) output is associated with chirp, which will limit transmission on non-dispersion shifted optical fibres, and the maximum bit-rate (determined by the laser's resonance frequency) is limited to around 10 Gbit/s. The third group of optical converters—the so-called coherent converters—rely on four wave mixing (FWM), and they may be realised using either optical fibres or semiconductor optical amplifiers (SOAs) as non-linear elements. Coherent converters are transparent to signal format, so many WDM channels may be converted simultaneously, but their conversion efficiency is normally low. A more serious drawback of the FWM converter is the dependency of the output wavelength on both the pump and the input signal wavelengths, and that two pumps will be needed to ensure polarisation insensitive operation. The fourth group of optical wavelength converters described today includes converters based on optically controlled gates. According to Stubkjaer et al., these converters seem to be the most promising all-optical converters, working by the principle of letting the input power control the gating of CW light at either a fixed or tuneable wavelength. Numerous approaches have been studied concerning the implementation of the optical gates, including the use of semiconductor optical amplifiers (SOAs)—through gain saturation or in interferometric waveguide configurations—or multi-section SOAs or optical fibres in non-linear optical loop mirror (NOLM) configurations. Yet another type of gate has been achieved by cross-absorption modulation in electro-absorption modulators. As concluded by Stubkjaer et al., recent research results on all-optical converters have shown excellent properties—particularly for converters based on optically controlled gates—and research in packaging and "second generation" devices is under way.

It is, however, a disadvantage of the present all-optical converters that they include the use of relatively complex semiconductor optical amplifiers or (as a less studied alternative) long fibre devices for obtaining the desired optical gating properties. It is, therefore, highly relevant to look for alternative physical mechanisms to provide the optical gating, which may eventually lead to improved optical wavelength conversion.

An interesting possibility concerning the development of new optically controlled switches is described in the patent application U.S. Pat. No. 5,907,647 entitled "Long-period grating switches and devices using them" by Eggleton et al. This invention describes means to obtain an optical switch by employing a long-period fibre grating for switching light between alternative optical paths. The fundamental elements of the device comprise a variable intensity light source, a length of optical waveguide dimensioned for co-propagating light in two distinguishable modes, and a long-period grating in the waveguide for coupling between the two modes. The waveguide is non-linear so that the effective refractive index is a function of intensity, and as a consequence, the coupling produced by the grating is a function of intensity, and different levels of light intensity can switch between the separate modes of the fibre waveguide. In the description by Eggleton et al., examples of the non-linear function of the waveguide such as glass (possibly doped with telluride or selenide) at sufficiently high intensities or other materials such as semiconductors or organic layered materials are mentioned An advantage of the invention described in U.S. Pat. No. 5,907,647 is that the signal source and the control source can have the same or different wavelengths, and they can pass through the waveguide in the same or different directions. It is, however, a disadvantage that the devices described by the invention of Eggleton et al. require the inclusion of a long-period waveguide grating. More specifically, it is described by Eggleton et al., how coupling between modes of the waveguide will not take place in the absence of the long-period grating, and, consequently, the switch described by Eggleton will not work, if the grating is omitted.

In addition to this, it is not described in U.S. Pat. No. 5,907,647, how the long-period grating switches may be used in a wavelength conversion set-up, and it will add complexity to the system to perform the necessary filtering of higher order modes (by the mode separators) discussed in the description by Eggleton. There is, consequently, a need for alternative waveguide components in order to obtain the desired wavelength conversion in optical WDM networks.

Recently, James S. Shirk and Armand Rosenberg (Laser Focus world, April 2000, pp. 121–129) published results on optical limiters using non-linear photonic crystals fabricated by incorporating organic dyes having a non-linear absorption or refraction. The overall idea behind these components is that the channels of a micro-structured (or nanochannel) glass structure are filled with a non-linear material, whose low-intensity refractive index matches that of glass. When intense light is incident on the structure, the index of the non-linear material is altered, resulting in the development of a bandgap, and that the transmission through the device will eventually drop. As described by Shirk and Rosenberg, recent studies of the optical properties of index-matched phthalocyanine (Pc) dyes have led to the development of materials that combine a large non-linear absorption with large non-linear refraction. Some of these materials have been designed to be liquid or low-melting-point glasses, so that they can be used to fill the tiny open channels in a nanochannel glass crystal. For illumination perpendicular to the nanochannels, as reported in the article by Shirk and Rosenberg, improved limiting properties are observed at short times and for low fluences in the photonic crystal. The reason is that contributions from the non-linear absorption and the photonic bandgap formation combine and add their effects. This is an improvement over the previously described optical limiters using a photonic crystal structure containing a thermal non-linear liquid, such as the one described by Lin et al., Optics Letters, Vol. 23, No. 2, January 1998.

An additional advantage of the limiter described by Shirk and Rosenberg is that because the decrease in transmission is due, in part, to an increase in reflectivity, the energy load on the non-linear material is reduced, lowering the potential for damage to the material.

Limiting is observed for 5 ns laser pulses, and the transmitted energy is limited to just over 250 nJ, i.e., the functionality of the device is demonstrated even at modest power density levels.

The work of Shirk and Rosenberg does not involve optical waveguides, and neither does it describe optical switching using non-linear properties of photonic bandgap structures. Some aspects of optical switching may, however, be found in the paper by Scholz, Hess and Rühle, entitled "Dynamic cross-waveguide optical switching with a non-linear photonic band-gap structure", published in OPTICS EXPRESS, Vol. 3, No. 1, July 1998. In this paper, a numerical study of a two dimensional all-optical switching device, which consists of two crossed waveguides and a non-linear photonic band-gap structure in the centre. The switching mechanism is based on a dynamic shift of the photonic band edge by means of a strong pump pulse, and it is modelled on the basis of a two dimensional finite volume time domain method. The described method solely considers orthogonal propagation of pump beam and signal beam, and the mentioned waveguiding is limited to two dimensions, i.e., the light is not confined in the third dimension. The work is, however, interesting because it indicates switching times in the order of $10^{-14}$ seconds.

It is a disadvantage of the switching device described by Scholz, Hess, and Rühle that waveguiding in three dimensions is not described, and that light confinement through optical waveguiding is not utilized.

It is a further disadvantage of the switching device described by Scholz, Hess and Rühle that more than one wavelength is not involved in the switching process.

It is still a further disadvantage of the switching device described by Scholz, Hess and Rühle that the orthogonally propagating pump light and signal light, only has a short interaction length, and therefore requires a very high non-linear response of the material. This will put limits to the wavelength range within which the photonic bandgap edges may be moved in practice.

It is still a further disadvantage of the switching device described by Scholz, Hess and Rühle that the device works by switching between guidance or reflection of the signal light, and therefore results in a significant reflected signal power.

It is well known that by the use of optical waveguides, the local intensity of optical mode fields may be locally enhanced, as it is well known from non-linear optical fibres.

It is a disadvantage of the optical limiter described by Shirk and Rosenberg that the optical limiters are not applying the property of optical waveguiding.

It is a further disadvantage of the optical limiters described by Shirk and Rosenberg, that they are not making use of the full wavelength span of the non-linear materials, since they fundamentally look at the ability to modify the reflection and transmission properties of a single wavelength through the PBG material.

It is a further disadvantage of the invention described by Eggleton that it does not make use of the improved waveguiding properties of micro-structured optical waveguides, and especially the new properties of photonic bandgap waveguides.

It is the object of the present invention to provide a new class of optical waveguides, in which the transversal waveguiding structure will be strongly dependent on the optical power level of the modes illuminating or propagating within the structure.

It is a further object of the present invention to provide an all-optical switching element in which the new class of non-linear optical waveguide is a key element.

It is still a further object of the present invention to provide an all-optical wavelength converter with potential applications especially within the area of telecommunication technology.

SUMMARY OF THE INVENTION

The present inventors have realised that the non-linear properties of optical limiters using non-linear photonic crystals may be enhanced in combination with a three dimensional optical waveguiding structure.

Furthermore, the present inventors have realised how to design a range of optical waveguides enhancing the non-linear properties needed for the wavelength conversion according to the fundamental idea. The waveguides are based on either the total internal reflection principle or the photonic bandgap principle. The specific design parameters of preferred embodiments are described in the following part of this description.

The fundamental problem to be solved by the invention is how to transfer optically encoded signal information from one wavelength to another wavelength in an efficient manner using a non-linear microstructured optical waveguide, which waveguiding properties are significantly altered as a function of the optical intensity of the encoding light.

In a first aspect of the invention there is provided an optical wavelength conversion device (which e.g., can be used in an optical fibre communication system) that comprises a micro-structured optical waveguide including sections comprising a non-linear material having an index of refraction, which changes as a non-linear function of light intensity. The optical waveguide comprises a light guiding core region in or around which an optical signal may be guided, and the waveguide is dimensioned to provide spatial overlap between the non-linear material and the light propagating within the waveguide. In the preferred embodiment, the wavelength conversion device further comprises a first optical light source for introducing light into said waveguide in a mode, which may be guided along the core at low power intensities. In order to modify the waveguiding properties for this first optical light wavelength, it is also preferred that the conversion device comprises a second intensity-modulated light source for introducing light into said waveguide in such a manner that it illuminates the sections filled with the non-linear material, said second light source having an intensity modulation sufficient to change the refractive index of the non-linear material by an amount sufficient to encode or induce modulation of the light from the first optical light source. The encoding or modulation thereby takes place through the effect of leaking light from the first light source from the inside of the guiding core to the outside of the guiding core.

It is preferred that the core region of the micro-structured optical waveguide is surrounded by a cladding region.

Since the present invention relates to the application of optical waveguides in which the light intensity levels have to be well controlled, it is highly useful to combine the wavelength converter with elements or spatially separate optical elements comprising amplifying means for adjusting the optical power levels to obtain improved performance. Here, the optical power levels of the first and/or second light source may be adjusted.

A very high degree of flexibility in waveguide design combined with amplification efficiency is to design a wavelength converter in which the amplifying element is a rare-earth doped waveguide section. For the preferred telecommunication applications today, rare-earth materials such as erbium and/or ytterbium may be a preferred choice, but as the optical wavelength band is expanded in future systems, other rare-earth materials may be of equally high relevance.

It is a very interesting aspect of the present invention that it does not limit itself to the fundamental type of waveguiding principle (i.e., it is neither limited to total internal reflection nor to the photonic bandgap effect). One possibility is, therefore, to design optical waveguides containing micro-structured features filled with optically non-linear material, wherein the waveguide core is realised with a raised refractive index compared to the refractive index surrounding the core, i.e., the waveguide is operating by the principle of total internal reflection.

As it will become clear from the following discussion of examples describing preferred embodiments, it will be advantageous to realise a wavelength converter according to the invention, and guiding light by the physical principle of total internal reflection in such a manner that the wavelength of the encoding light wavelength $\lambda_1$ relates to the wavelength of the encoded light $\lambda_2$, according to the relation $\lambda_1 < \lambda_2$, since this will allow for the encoding wavelength to maintain guided, while the longer wavelength will be allowed to leak out of the waveguiding structure.

It is also within an embodiment of the first aspect of the invention that the wavelength converter may be realised by designing a waveguide containing features filled with non-linear material and further containing more than one core element or core region. This will allow the optical power to be coupled between the different core regions, further allowing spatial separation of the output from the wavelength converter. The number of core elements may for example be 2 core elements, 3 core elements, 5 core elements, or 10 core elements.

As already mentioned, the invention also works in cases where the waveguiding may be controlled by the photonic band-gap effect, i.e., in cases in which the waveguide core region is realised with a lowered refractive index compared to the refractive index surrounding the core, and in which the micro-structured waveguide comprises a multiplicity of spaced apart cladding-structure features that are elongated in the waveguide axial direction and disposed in the waveguide material or the cladding region. In this case the cladding structure may have a periodic distribution of the micro-structured features.

The first aspect of the invention further covers embodiments in which the wavelength converter may be realised with a low-index core—guiding by the PBG effect—and for such designs, very feasible dimensions may be obtained, if the wavelength of the encoding light wavelength $\lambda_1$ relates to the wavelength of the encoded light $\lambda_2$, according to the relation $\lambda_1 > \lambda_2$. Hereby, a very sensitive movement of the guided mode may be obtained within the photonic band-gap, while working with dimensions of the periodicity of the cladding structure that can be manufactured with todays technology.

The wavelength converter according to the first aspect of the invention may also be realised having more than one PBG-guiding core elements between which the optical power of one optical wavelength, $\lambda_2$, may be coupled in a manner controlled by the optical power of a second optical wavelength, $\lambda_1$. The number of core elements may for example be 2 core elements, 3 core elements, 5 core elements, or 10 core elements.

It is preferred that the wavelength converter according to the first aspect of the invention may be realised with the micro-structured optical waveguide comprising an optical fibre. Several advantages are obtained by this realisation, and among the central are a very easy adaptation to existing optical communication systems, and access to the most mature waveguide technology within the area of photonic band-gap waveguides.

However, as an alternative, it is also within an embodiment of the first aspect of the invention that the wavelength converter can be realised with the micro-structured optical waveguide comprising an optical planar waveguide. This has the advantage of allowing integration with other optical functionalities on the same waveguide wafer.

One of the advantages of this invention is that the interaction length of the light with the waveguiding structure may be made considerable, allowing for the use of a weaker non-linear process or alternatively making the devices operate at lower threshold powers. In order for this to be used most efficiency, a wavelength converter according to the invention should be made in a manner wherein the encoding light predominantly is guided along the same waveguide axis, as the light to be encoded.

The waveguide realisation of the wavelength-converting device according to the invention allows a high degree of interaction control between propagating modes and specific waveguide features. In a further preferred embodiment, of such a wavelength converter the encoding light and the light to be encoded may, therefore, be co-propagating, allowing a very strong interaction and lower power threshold values.

Yet for other applications, it will be advantageous to physically separate the input port for the encoding light and the light to be encoded. Also in this case the waveguiding property may be of central importance, and in a preferred embodiment, a wavelength converter according to the invention may have the encoding light and the light to be encoded counter-propagating.

There will, however, also be applications, where small physical dimensions, or short interaction length requirements points towards realisations, where only one of the light fields are guided. For such applications, a preferred embodiment will be a wavelength converter according to the invention, wherein the encoding light has a predominant propagation direction, which is different from that defined by the waveguide axis.

For practical realisation of the wavelength converter according to the invention, it is preferred that the core has a diameter larger than 2 microns in the cases, where a raised-index core is used, because these dimensions generally will result in spotsize values that are appropriate for coupling to components used in standard optical communication systems.

As it will be further argued in the discussion of the examples, a waveguide according to the invention, and having a raised-index core, could in a preferred embodiment further be containing a waveguide feature to which the light may be leaking at high intensities, and having the boundary of this feature placed at a distance from the core centre, which is larger than 0.75 times the core diameter, such as larger than 1.0 times the core diameter, such as larger than 1.5 times the core diameter, such as larger than 2.0 times the core diameter. These specific parameters may depend on the filling fraction of non-linear material, the non-linear coefficient, and the specific waveguide design.

An important design parameter for micro-structured optical waveguides is the so-called pitch, or centre-to-centre spacing between the nearest cladding-structure features. It should also be noted that these cladding structure features very often comprise air-filled voids or air holes. Depending on the specific application of the wavelength-converting device and the involved wavelengths, a wavelength converter according to the invention would in preferred embodiments be designed to have the centre-to-centre spacing of nearest air holes smaller than 5.0 $\mu$m, such as around 4.0 $\mu$m, such as around 3.0 $\mu$m, such as around 2.0 $\mu$m, such as around 1.0 $\mu$m, such as around 0.5 $\mu$m, or even smaller.

As further described in the following examples, a waveguide according to the invention, and having a low-index core region, may be designed with great flexibility by using optimal trade-off between the filling fraction of the air holes in the cladding and that of the non-linear material. Depending on the specific application, this leads to preferred embodiments in which the features filled with non-linear material has a cross-section area which is at least 10% as large as the cross section area of the cladding-structure features, such as a cross-section area which is at least 20% of the cross-section area of the cladding-structure features, such as a cross-section area which is at least 40% of the cross-section area of the cladding-structure features, such as a cross-section area which is at least 75% of the cross-section area of the cladding-structure features, such as a cross-section area which is at least 100% of the cross-section area of the cladding-structure features, such as a cross-section area which is at least 200% of the cross-section area of the cladding-structure features.

The present invention also covers embodiments, in which the micro-structured optical waveguide is dimensioned such that the sections comprising a non-linear material are placed within a distance from the core centre which is smaller than 10 times the operating wavelengths of the encoding and/or encoded light, such as smaller than 8 times the operating wavelengths of the encoding and/or encoded light, such as smaller than 6 times the operating wavelengths of the encoding and/or encoded light, such as smaller than 4 times the operating wavelengths of the encoding and/or encoded light, such as smaller than 2 times the operating wavelengths of the encoding and/or encoded light, or such as smaller than 1 time the operating wavelengths of the encoding and/or encoded light.

From the above discussion it should be clear that the first aspect of the invention covers an optical wavelength conversion device including a micro-structured optical waveguide. However, the present invention also covers a micro-structured optical waveguide itself.

Thus, according to a second aspect of the present invention there is provided a micro-structured optical waveguide having an axial direction and a cross section perpendicular to said axial direction, the micro-structured optical waveguide including sections that are elongated in the axial direction and comprising a non-linear material having an index of refraction, which changes as a non-linear function of light intensity, said waveguide including a light guiding core region being elongated in the waveguide axial direction, and said waveguide being dimensioned for providing spatial overlap between the sections filled with the non-linear material and the light propagating within the waveguide. Thus. The transversal waveguiding structure may depend on the optical power level of the modes illuminating or propagating within the structure. It is preferred that the core region is surrounded by a cladding region. It is also preferred that the micro-structured optical waveguide is an optical fibre or comprises an optical fibre.

According to an embodiment of the second aspect of the invention, the waveguide core may be realised with a raised refractive index compared to the refractive index surrounding the core.

However, it is also within an embodiment of the second aspect of the invention that the waveguide core region may be realised with a lowered refractive index compared to the refractive index surrounding the core. Here, the waveguide may comprise a multiplicity of spaced apart cladding-structure features that are elongated in the waveguide axial direction and disposed in the cladding region surrounding the core region.

According to embodiments of the second aspect of the invention, the waveguide may comprise a plurality of core regions or elements, such as for example 2 core elements, 3 core elements, 5 core elements, or 10 core elements.

In a preferred embodiment of the second aspect of the invention, the core region may have a diameter larger than 2 microns. It is also preferred that the waveguide further comprises a cladding zone to which the light may be leaking at high intensities, and having an inner boundary of this zone placed at a distance from the core centre, which is larger than 0.75 times the core diameter, such as larger than 1.0 times the core diameter, such as larger than 1.5 times the core diameter, or such as larger than 2.0 times the core diameter.

When the waveguide according to the second aspect of the invention comprises cladding structure features in the cladding region, these waveguide cladding structure features may be air holes, and the centre-to-centre spacing of nearest air holes may be smaller than 5 $\mu$m, such as around 4.0 $\mu$m, such as around 3.0 $\mu$m, such as around 2.0 $\mu$m, such as around 1.0 $\mu$m, such as around 0.5 $\mu$m, or even smaller.

When the waveguide comprises cladding structure features in the cladding region, it is also within an embodiment of the present invention that the waveguide sections comprising the non-linear material have a cross-section area, which is at least 10% as large as the cross-section area of the cladding-structure features, such as a cross-section area which is at least 20% of the cross-section area of the cladding-structure features, such as a cross-section area which is at least 40% of the cross-section area of the cladding-structure features, such as a cross-section area which is at least 75% of the cross-section area of the cladding-structure features, such as a cross-section area which is at least 100% of the cross-section area of the cladding-structure features, or such as a cross-section area which is at least 200% of the cross-section area of the cladding-structure features.

According to an embodiment of the second aspect of the invention, it is preferred that the micro-structured optical waveguide is dimensioned such that the sections comprising the non-linear material are placed within a distance from the core centre which is smaller than 10 times the operating wavelength of the light to be guided by said core region, such as smaller than 8 times the operating wavelength of the light to be guided by said core region, such as smaller than 6 times the operating wavelength of the light to be guided by said core region, such as smaller than 4 times the operating wavelength of the light to be guided by said core region, such as smaller than 2 times the operating wavelength of the light to be guided by said core region, or such as smaller than 1 time the operating wavelength of the light to be guided by said core region.

The second aspect of the invention also covers embodiments wherein the waveguide comprises waveguide features containing a photo-sensitive material in which permanent refractive-index changes may be induced.

It has already been discussed that the optical waveguide according to embodiments of the second aspect of the present invention may comprise a multiplicity of spaced apart cladding-structure features, which cladding structure features may be air holes or voids. Here, it is preferred that these cladding features are elongated in the waveguide axial direction and disposed in the cladding region, and it is furthermore preferred that the cladding-structure features predominantly are periodical cladding-structure features. The cladding-structure features may be placed in different arrangements, such as placed in a close-packed arrangement, such as placed in a honey-comb structure, or such as placed in a Kagomé structure. When placed in a honey-comb structure, the sections comprising the non-linear material may be placed within a distance from the core centre of one time the distance between the nearest cladding-structure features in the cladding.

In the cases, where the optical waveguides are operating by the photonic bandgap effect, it may be a requirement, that the micro-structured waveguide comprises a multiplicity of spaced apart cladding-structure features, which predominantly are periodically distributed within at least part of the cladding. In cases where total internal reflection is the fundamental waveguiding principle, it may, however, also be an advantage to provide a cladding with periodical distribution of the cladding-structure features, e.g., for fabrication simplicity or for obtaining specific waveguiding properties. The use of a close-packed arrangement may simplify the fabrication process for certain waveguide designs. It should also be mentioned that a good method for obtaining relatively large band gaps in PBG guiding waveguides may for example be to place the cladding-structure features in the honey-comb structure or the Kagomé structure or another non-close-packed structure.

It should be understood that according to embodiments of the second aspect of the invention, the sections comprising the non-linear material may be voids, channels or holes being elongated in the axial direction of the waveguide and arranged in the cladding layer surrounding the core region or regions. The sections comprising the non-linear material may be placed in different arrangements, such as being periodically arranged in the cladding surrounding the core region(s), such as placed in a close-packed arrangement, or such as placed in a in a honey-comb structure.

It should be understood that it is within the scope of the present invention that the wavelength conversion device according to the first aspect of the invention also covers embodiments in which the micro-structured optical waveguide is selected from any of the embodiments of the optical waveguide according to the second aspect of the invention.

The present invention also covers a third aspect in which there is provided an optical system comprising a first source of encoding modulated light, a first length of optical waveguide for carrying said encoding modulated light, a second source of light to be encoded having a wavelength different from the wavelength of the first source, a second length of optical waveguide for carrying said light to be encoded, a waveguide coupler to join the two light wavelengths into the same waveguide, a wavelength converting waveguide containing sections filled with non-linear material and for controllably converting the signal information from the first wavelength to the second wavelength, and a third and a fourth length waveguide to guide the light into and out from the wavelength converter. Here, the wavelength converting waveguide may be or comprise a micro-structured optical waveguide selected from any of the embodiments of the optical waveguide according to the second aspect of the invention. However, the wavelength converting waveguide may alternatively be or comprise an optical planar waveguide.

A micro-structured optical waveguide including sections of the waveguide filled with a material having an index of refraction, which changes as a non-linear function of light intensity and dimensioned to provide spatial overlap with the light propagating within the waveguide, may not only be used to modify the light propagation at modulation frequencies equal to the signal bit rate. Another possibility is to make use of the non-linear property, and operate the component by a control wavelength, which is intensity modulated at a much lower frequency rate. This may be used to form an optical switching device comprising a core region in or around which an optical signal may be guided for low intensities of optical power, but as the control light power is increased the bit stream from a first optical light source may be switched off.

Thus, according to a fourth aspect of the invention there is provided an optical switching device comprising a micro-structured optical waveguide including sections comprising a material having an index of refraction which changes as a non-linear function of light intensity, said wave guide including a light guiding core region, and said waveguide being dimensioned for providing spatial overlap between the sections filled with a non-linear material and light propagating within the waveguide. The optical switching device further comprises a first optical light source for introducing light into said waveguide in a mode guided along the core, and a second variable intensity light source for introducing light into said waveguide in such a manner that it illuminates the sections filled with a non-linear material, said second light source having an intensity variation sufficient to change the refractive index of the non-linear material by an amount sufficient to induce switching of the light from the first optical light source, whereby said switching takes place through the effect of leaking light from the first light source from the inside of the guiding core to the outside of the guiding core. Here, the micro-structured optical waveguide may be or comprise a micro-structured optical waveguide selected from any of the embodiments of the optical waveguide according to the second aspect of the invention. However, the micro-structured optical waveguide may alternatively be or comprise an optical planar waveguide.

According to a fifth aspect of the present invention there is provided an optical intensity limiting device comprising a micro-structured optical waveguide including sections comprising a material having an index of refraction which changes as a non-linear function of light intensity, said waveguide including a light guiding core region, and said waveguide being dimensioned for providing spatial overlap between the sections filled with a non-linear material and light propagating within the waveguide. The intensity limiting device further comprises a first optical light source for introducing light into said waveguide in a mode guided along the core in such a manner that it illuminates the said sections filled with a non-linear material, and having a strongly increasing propagation loss for optical powers above a certain threshold value. Here, the micro-structured optical waveguide may be or comprise a micro-structured optical waveguide selected from any of the embodiments of the optical waveguide according to the second aspect of the invention. However, the micro-structured optical waveguide may alternatively be or comprise an optical planar waveguide.

For the devices or systems according to the present invention it is within preferred embodiments that the micro-structured waveguide comprises waveguide features containing a photo-sensitive material in which permanent refractive-index changes may be induced. Thus, it may be advantageous to combine the attractive features of the described wavelength converter, with additional optical functionalities obtained through the inclusion of waveguide features, where features of the micro-structure are containing a photo-sensitive material (e.g., for the ability to write permanent refractive index structures in the waveguide, and hereby tune the properties of the waveguide converters).

It should be noted that the present invention is not limited to cases in which only two wavelengths are involved in the operation of the system or device. It will also be a possibility to design micro-structured non-linear optical waveguides for operation of more than two involved wavelengths, e.g., for the development of new optical components, which applies four-wave mixing (FWM). Such components could be relevant for processes such as mid-span spectral inversion or other advanced optical techniques. Thus, the devices or systems of the present invention also covers embodiments in which more than two involved wavelengths are interacting.

Other interesting aspects of the optically controlled micro-structured waveguide comprising non-linear sections is that they allow the control of other optical properties than wavelength conversion, since controlled coupling between different waveguide sections—these having different dispersion properties—potentially leads to the development of optically controlled dispersion manipulating devices. We may envision the possibility of designing adjustable dispersion compensating devices, e.g., for fine tuning of single-channel dispersion. In more general terms, the micro-structured optically controlled non-linear waveguide may also be used for optically controlled delay elements, e.g., through optically controlled coupling between different waveguide sections.

The optically controlled waveguide properties of the devices according to the invention may also in preferred embodiments be used as demultiplexing elements in optical time division multiplexing (OTDM) systems, since synchronization of a bit stream at a given wavelength and pulses from a channels-selection-control light source (emitting pulses at a lower repetition rate than the first bit-stream) could be used for the subtraction of individual time OTDM channels. For proper configurations, e.g., applying counter-propagating optical signals, the device may operate also if both bit streams operate at the same wavelength.

BRIEF DESCRIPTION OF THE DRAWINGS

The functionality and additional features of the invention will become dearer upon consideration of the different embodiments now to be described in detail in connection with the accompanying drawings. In the drawings.

It is to be understood that these drawings are for the purpose of illustrating the concepts of the invention and they are, therefore, not made to scale.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

This description is divided into four parts. Part I describes the fundamental nature and qualitative functionality of the micro-structured non-linear waveguide. Part II describes the qualitative function of an optically controlled switch according to the invention, Part III describes preferred wavelength conversion devices using the optically controlled gating element based on an exemplary micro-structured non-linear waveguide gate, and Part IV describes alternative approaches in the optical control of micro-structured non-linear waveguiding devices.

I. The Optically Controlled Micro-Structured Waveguide

The waveguide can be either an optical fibre or a planar waveguide.

At low power levels, the optical modes propagate through the unperturbed (or only weakly perturbed) waveguide structure.

Figure 1:
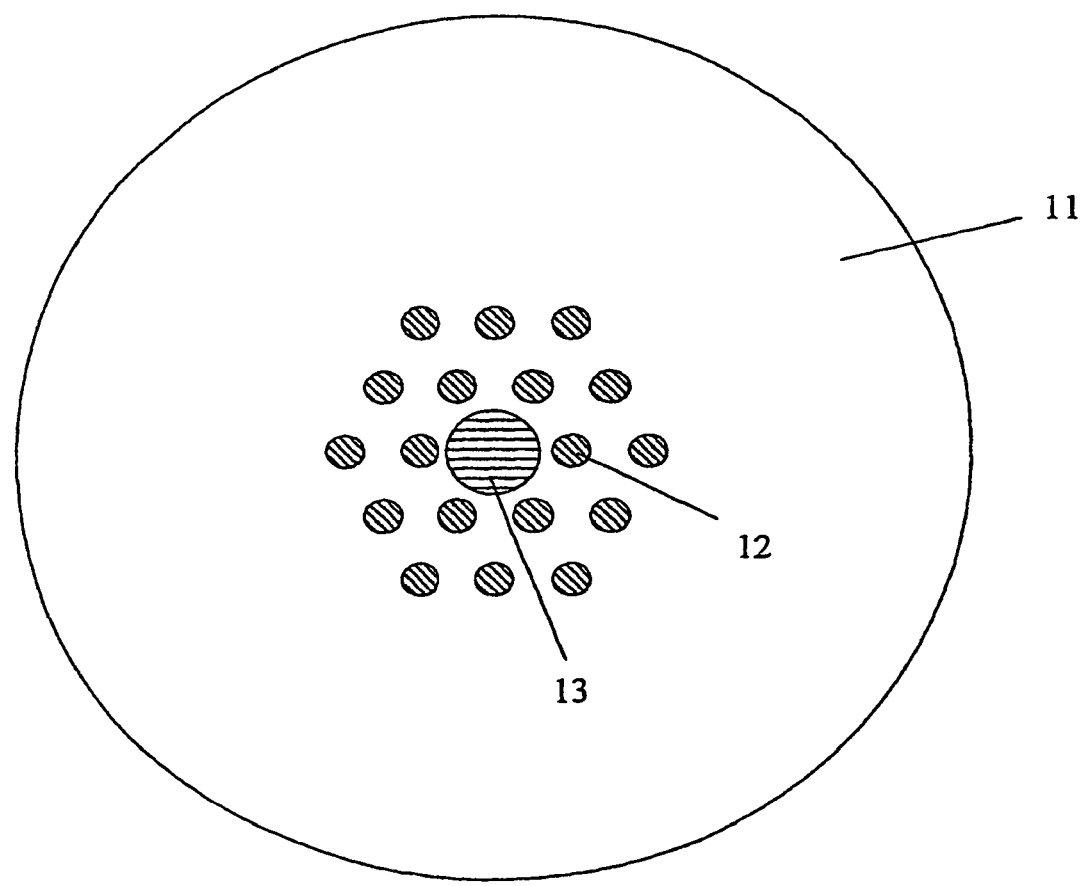
FIG. 1 shows an example of the transversal cross section of a micro-structured waveguide/fibre having elements filled with non-linear material.

Referring to the drawings, FIG. 1 schematically illustrates the transversal cross section of a micro-structured optical waveguide made of a background material (11) having near core elements (12) filled with a material having an index of refraction, which is a non-linear function of light intensity. Such non-linear materials could for example be organic dyes having a non-linear absorption or refraction. The elements (12) could for some waveguide designs preferably be made with a refractive index that matches the refractive index of the background material (11) for small light intensities, and changes for higher light intensities. Yet for other embodiments, it will be most advantageous to have a non-linear index of refraction, which deviates from that of the background material at lower light intensities. The background material would in a preferred embodiment be made of glass, but other possibilities such as polymers are also included by the invention. The waveguide described in FIG. 1 has a core region (13), which in a preferred embodiment will have an index of refraction, which is higher than the index of refraction of the background material. This may for example be accomplished as in standard optical fibres by weakly doping the glass in the core region by materials such as germanium or aluminium.

When an electromagnetic field (preferably an optical field) with higher intensity is propagating through the micro-structured waveguide, the optical properties of the non-linear material in the waveguide features are modified, and the waveguiding properties of the high intensity mode field as well as the waveguiding properties of other electromagnetic fields are modified.

For the optical limiters based on the PBG effect as described by Shirk and Rosenberg, the optical fields were not guided through a waveguiding structure. In contrast to these intensity dependent optical materials, the present inventors have realised how to increase the non-linear response significantly by the application of the waveguiding property. In contrast to prior art, we obtain the possibility of controlling light between guided and non-guided (or leaky) modes, whereby much lower power levels are necessary for the non-linear property to be used. This enhanced effect will allow us to design waveguiding devices according to the invention, which are compact and require relatively low optical powers to work.

Figure 2:
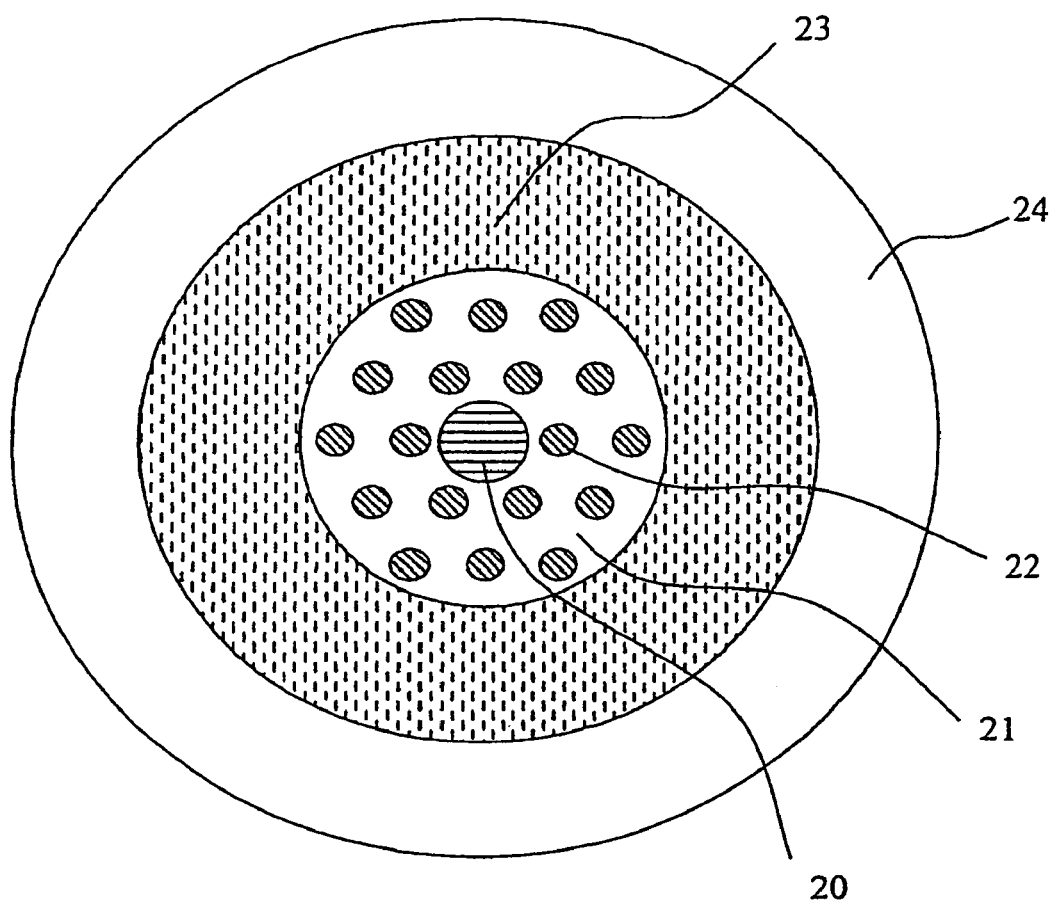
FIG. 2 shows an example of the transversal cross section of a micro-structured waveguide/fibre having elements filled with non-linear material, and having a raised cladding index region for enhanced mode leakage control.

In FIG. 2 another example of a waveguide according to the invention is illustrated. In this case the waveguide has a core (20) surrounded by a inner cladding background material (21) in which a microstructure with features (22) containing optically non-linear material are located. In the present example the micro-structured features are placed in a close-packed arrangement, but it will not be a requirement for all the waveguides covered by the invention that the micro-structure necessarily has to show periodicity. The waveguide structure illustrated in FIG. 2 further contains a cladding region (23) of a different material and/or a different refractive index than that of the inner cladding background material (21). The function of this cladding region (23) is that it will work as a waveguide zone into which the mode, which is guided within (and/or in the near vicinity of) the core region of the waveguide at low intensities, will leak into at higher intensities due to the non-linear property of the micro-structured features in the inner cladding region. It should be stressed that the circular shape of the cladding region (23) is not a requirement for the waveguide to work according to the invention, and it could actually be a further advantage to operate with a non-circular cladding region (such as the ones often applied in cladding pumped active optical fibres), because it may enhance the cladding mode dissipation and, prevent mode interference patterns to disturb the operation of the waveguiding device. Yet in other cases, the interaction between core modes, and specific cladding modes may be enhanced through specific design of the magnitude and shape of the outer cladding region (23), and in such cases a ring shaped form as illustrated in FIG. 2 may prove advantageous. In FIG. 2, we have finally illustrated an outer fibre region (24), which may be index matched to the leakage-control cladding region (23), or have a refractive index, which may enhance the mode leakage in some cases (higher index) or in other cases may improve the control of specific cladding modes (typically having a lower refractive index in region (24)).

One of the desired features of an optical converter is that it has a high dynamic range, because signal levels in the switch blocks will be path dependent. A unique feature of the present invention is that it allows for a direct integration or inclusion of amplifying parts (erbium doping) within or in combination with the micro-structured waveguide. Thereby, the device will have the potential of adapting to different signal power levels, leading to a higher dynamic range.

Figure 3:
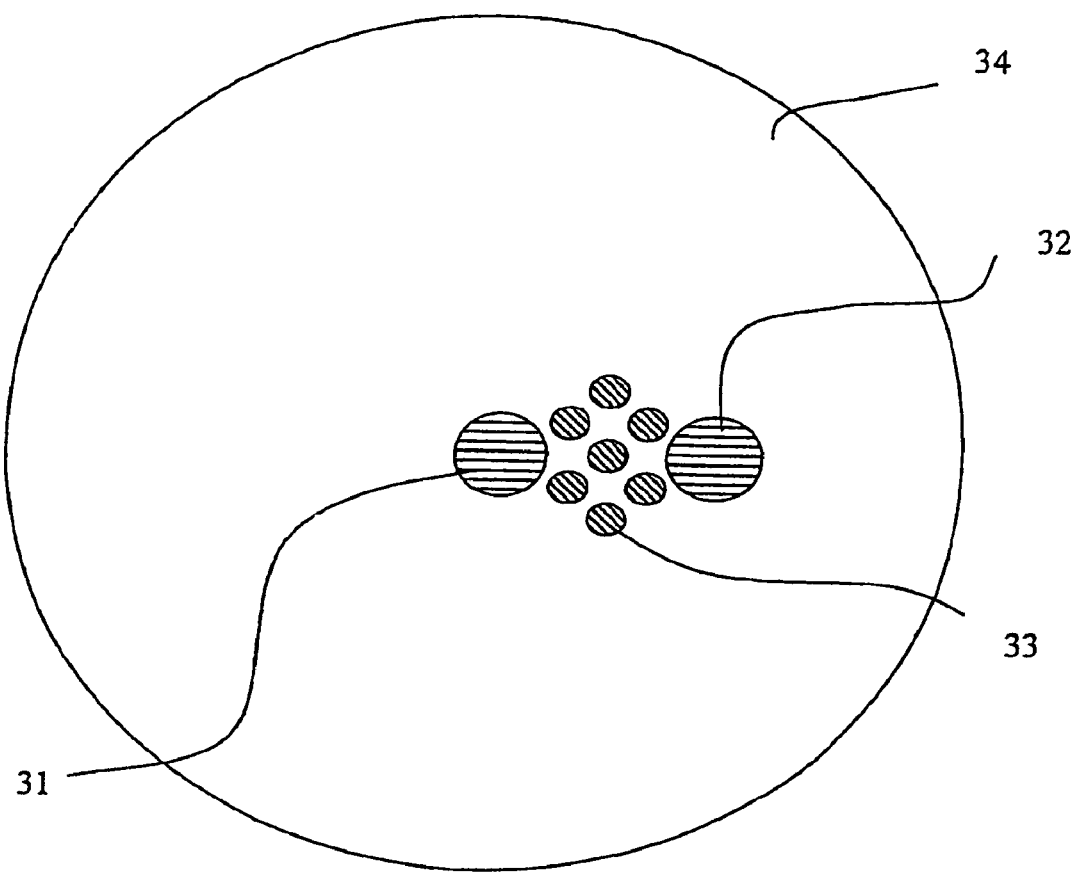
FIG. 3 shows an example of the transversal cross section of a micro-structured waveguide/fibre having elements filled with non-linear material and at least two core regions.

FIG. 3 illustrates another example of a fibre cross-section according to the invention. In this case, the fibre has at least two core regions (31) and (32). These core regions may in a preferred embodiment be separated so much that only very limited power is coupled between them for transmission of low power levels. However, as the optical power level (from either the signal itself, or from a control light source) is increased, the refractive index of the micro-structured features (33) containing optically non-linear material will change, leading to a leakage of optical power between the core regions (31) and (32). The fibre background material (34) may be realised in materials such as glass, polymers or other suitable materials. In another preferred embodiment, the coupled waveguide core regions may have a significant coupling—even in the case of low intensity power propagation—and in this case the non-linear micro-structured features (33) will act as means of modifying the coupling length of the waveguide device. It should also be noted that the core regions may be realised through standard waveguide technology using total internal reflection as the guiding principle, or (for periodic structures) as photonic bandgap guiding waveguides. In both cases unique waveguiding properties may be obtained, and the device will allow optical signal power to be switched between waveguide core regions.

Figure 4:
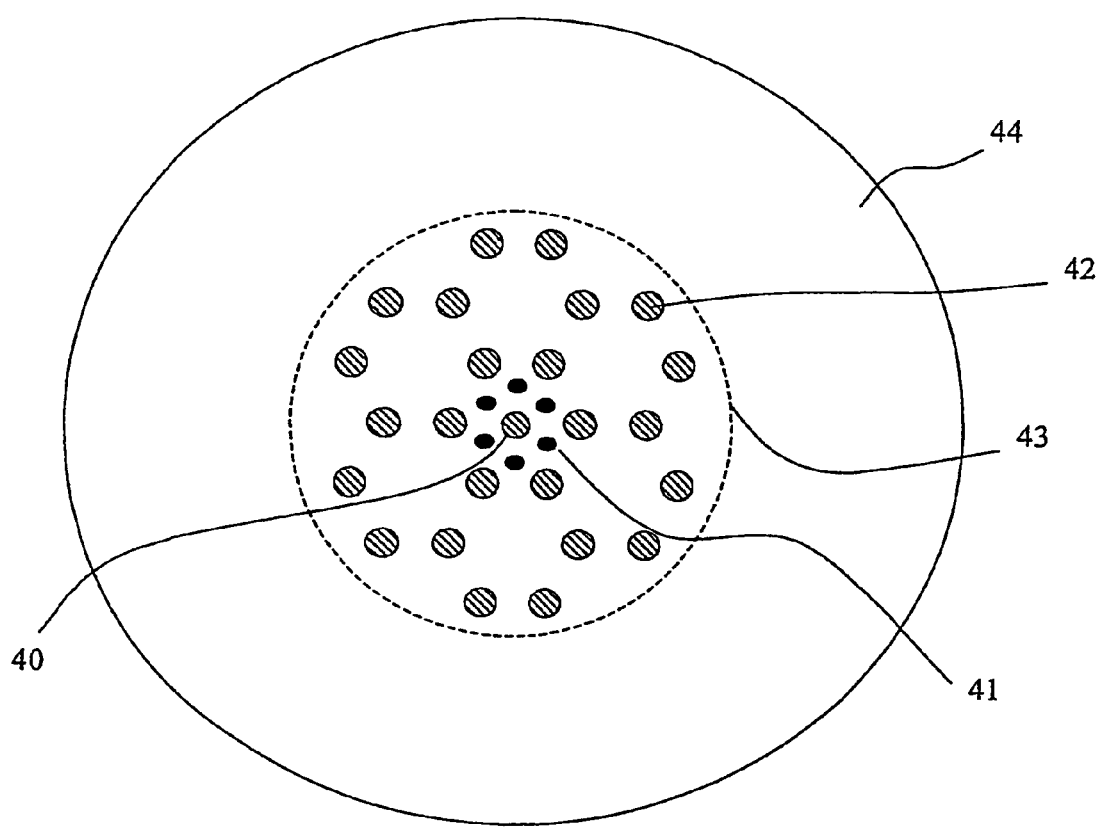
FIG. 4 shows an example of the transversal cross section of a honeycomb-structured photonic bandgap fibre having elements filled with non-linear material near the central core region.

In FIG. 4, another preferred embodiment of a wavelength converting waveguide device is schematically illustrated. FIG. 4 shows the cross-section of a honey-comb structured photonic bandgap fibre, consisting of a core region formed by a defect (40)—which preferably could be a void—located within a periodically distributed micro-structure of features (42), providing the photonic bandgap. The cladding structure features (42) may also typically be voids, and they are in this example all placed in a homogeneous background material located within a section (43) of the fibre, large enough to provide a local confinement of the mode field, when low-intensity optical signals are transmitted. The structure also includes micro-structured features (41) containing optically non-linear material, and the fibre could outside the PBG region be over-cladded by a homogeneous material (44). In the described example of FIG. 4, the fundamental operation of the device is that the core defect (which has an average index below that of the fundamental space filling mode of the cladding) is modified by an increase of the refractive index of the features containing non-linear material. Hereby a threshold is reached, at which the signal no longer is guided, and for powers above this threshold, the signal becomes highly leaky. Now, if the non-linear refractive index of the features (41) is controlled by an optical mode (the control light) launched at another wavelength than the first mentioned signal source, and the control light is modulated, then it will be possible to transfer this modulation to the first signal wavelength. We will in an additional example in the following text describe, how the combination of non-linear micro-structured features and TIR-guided modes in contrast to PBG-guided modes will indicate preferred relations between the wavelengths of the encoding signal, and the encoded signal.

II. Optical Switch

Figure 5:
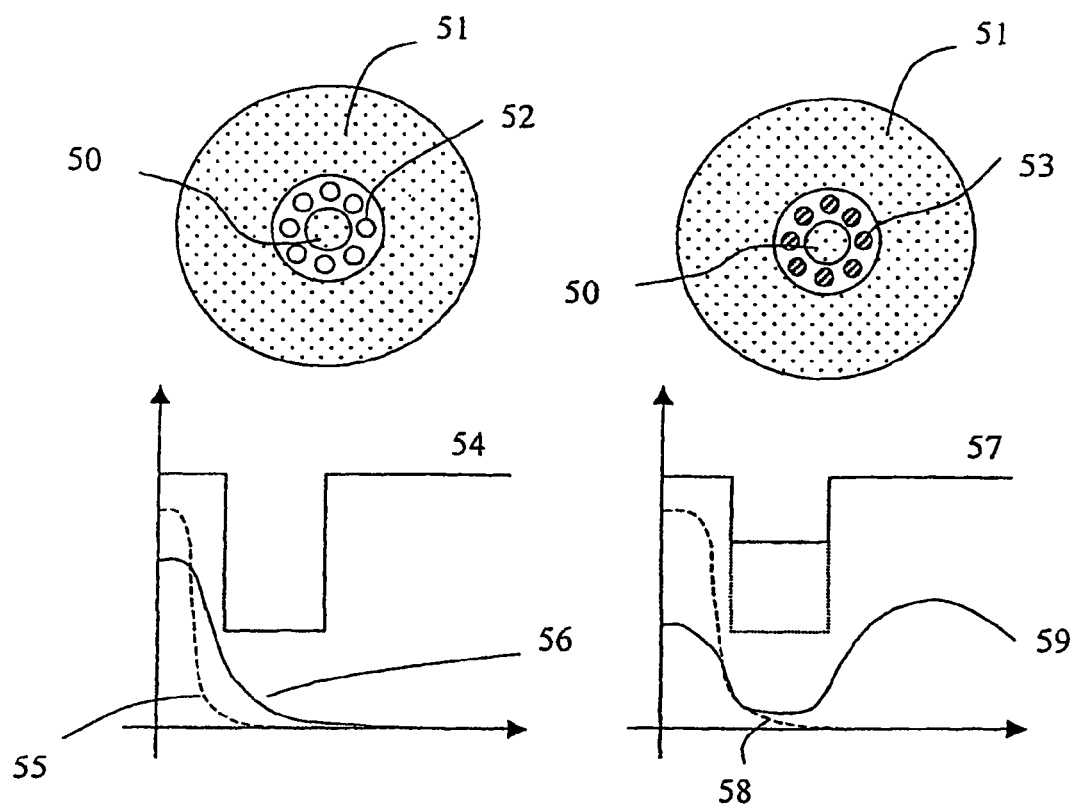
FIG. 5 illustrates schematically the operation of a so-called depressed-cladding fibre having an effective index modification and resulting signal mode control due to elements filled with non-linear material.

FIG. 5 provides a schematic illustration of the physical principle behind a preferred embodiment of the optically controlled waveguide-switching element according to the invention. In a preferred embodiment, such as the one illustrated here, the fundamental waveguiding principle is total internal reflection, and these TIR-guiding waveguides are considered realised as depressed cladding structures in which the refractive index of the core (50) is substantially equal to the refractive index of the outer cladding (51). If the inner cladding region contains micro-structured features (52) filled with an optically non-linear material, and we, furthermore, assume the refractive index of these features to be index-matched with the background material of the inner cladding region at low light intensities, then the optical mode may be confined to the core region of the fibre. This is further illustrated on the lower part of the figure, where the index profile (54) of the waveguide is shown for two different wavelengths $\lambda_1$ (dashed curve (55)) and $\lambda_2$ (solid curve (56)). In the present example, the wavelengths are chosen so that $\lambda_1 < \lambda_2$. As the intensity of the light is increased, and we here assume for simplicity that it is the intensity of the control light at wavelength $\lambda_1$, which is increased, the result of this intensity adjustment is that the optically non-linear material in the features (53) increases its refractive index. In the lower illustration on the right-hand side of FIG. 5, this is illustrated as a lifting of the average refractive index in the depressed cladding section of the index profile (57). As a consequence of this modified refractive index profile, the optical modes of the waveguiding structure are transversally changed, and as a result the control mode at wavelength $\lambda_1$ is somewhat broadened, however, the transversal modification is much stronger for the wavelength $\lambda_2$, which becomes highly leaky. This effect may be enhanced further, e.g., by bending the optical fibre, but the consequence will in any case be a significant change in optical transmission loss for the wavelength $\lambda_2$. It is hereby described, how we may obtain an optically controlled switch, in which the attenuation of the signal at wavelength $\lambda_2$ may be altered by controlling the intensity of the optical power carried by the control wavelength $\lambda_1$. It should in connection with the discussion of FIG. 5 be noted that the mode fields are shown on an arbitrary amplitude scale, and the illustrations are, therefore, not indicating the power levels necessary for the switching procedure. However, we stress that the optical power levels due to waveguiding should be significantly lower than those obtained by Shirk and Rosenberg, where optical limiting was reported at 250 nJ.

Figure 6:
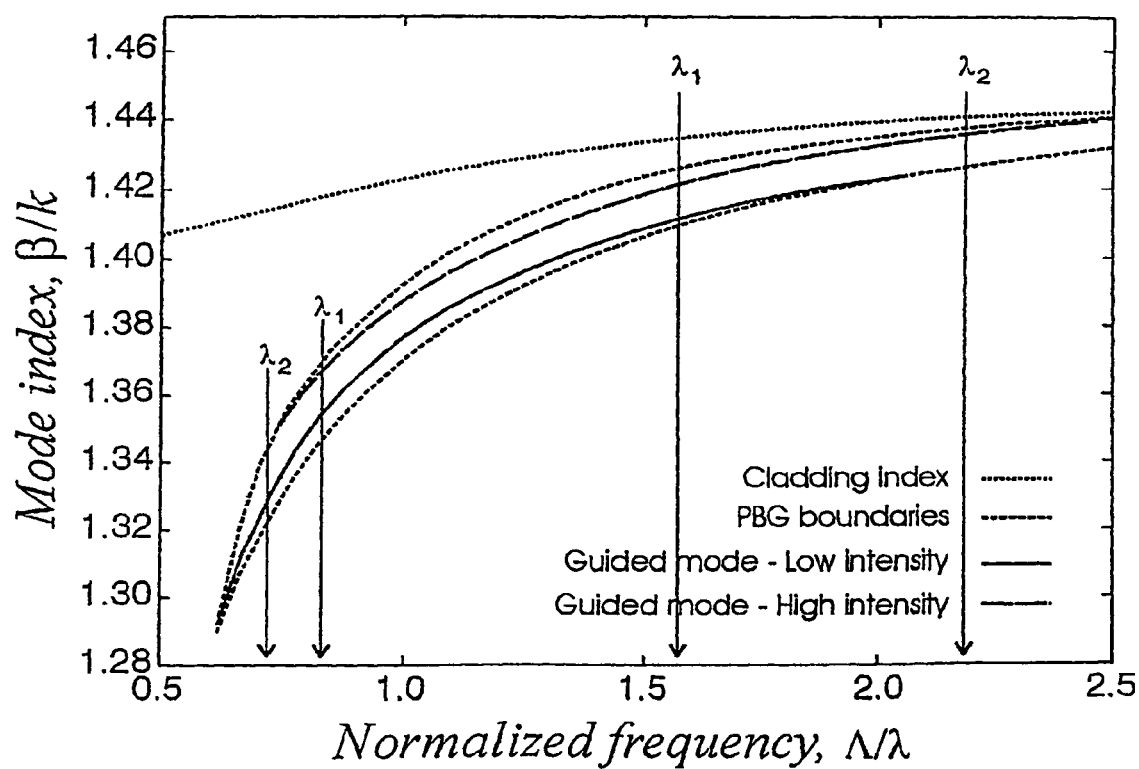
FIG. 6 shows a band diagram for a honeycomb-structured photonic bandgap fibre illustrating the modification of the propagating properties of the core mode as the control power is switched from low to high intensity—and vice versa.

After now having discussed the switching ability of the high-index core fibres operating by the TIR-like principle, we will now turn to a preferred embodiment applying a PBG waveguide. In the chosen example, a honeycomb-structured photonic bandgap fibre with a low-index core region has been chosen, and in FIG. 6 the band diagram for the honeycomb fibre design is shown. We here refer to a waveguiding structure as the one shown in FIG. 4, and the example is chosen with a honeycomb-structured cladding with distance $\Lambda$ between the air-filled holes, which are placed in a silica background material. In this particular example, the hole diameter of these cladding features are given as $d=0.40\cdot\Lambda$, and for low-intensity optical powers propagating through the structure, the features (41) containing optically non-linear material are assumed to have the same refractive index as the silica background material. The guided mode field is, therefore, confined to the core region by the air-filled core hole (often denoted "the defect" of the photonic band gap waveguide), which in the specific example chosen here has a diameter of $d_{core}=0.40\cdot\Lambda$. In FIG. 6 is shown the photonic band gaps, which are typical for the honeycomb-structured cladding of the example, and located within this bandgap we find the solution for the guided mode related to the core defect of the fibre waveguide. We note that the guided mode solution enters the band gap from the top (around a normalised frequency of $\Lambda/\lambda=0.6$) and traverses it before it exits at the lower band gap boundary for a normalised frequency around $\Lambda/\lambda=2.0$. It should be pointed out that the physical effect of the mode moving outside of the band gaps is that the guided mode will not immediately cease to exist, but it will be co-propagating with the continuum of leaky cladding modes, and it will in practice couple to these and hereby the power will be rapidly dissipated. We may, therefore, in practice consider the core mode to leak its power over very short distances, when the solution exits the band gap.

We will now use this effect to obtain the desired switching functionality described by this invention, and, furthermore, obtain some preferred relations between the wavelengths of signal light and control light, respectively. We will, therefore, start by directing this example towards the most feasible waveguide designs, namely those having the largest possible dimensions (the hole distance $\Lambda$). In practice, this means that we will consider placing both signal wavelength and control wavelength in the high-value end of the guided mode band illustrated in FIG. 6 (i.e., relatively close to the point, where the core mode solution traverses below the lower band gap limit at $\Lambda/\lambda=2.0$). Now as the power level is increased for the control light, the non-linear material in the features located in the near core region of the fibre waveguide will get a higher refractive index (than that of the silica background material). Since the location of the optical band gap is determined by the cladding structure, the limits of the optical band gap will not be influenced. However, the modification of the refractive index will result in a movement of the guided mode solution of the core mode, and as illustrated in FIG. 6 the guided mode curve for the higher-intensity power solution is moved upwards compared to the low-intensity solution. If the signal wavelength is placed such that an in-band solution is obtained for low-intensity propagation, but outside the band for high-intensity control light, the signal will move from a state of being strongly confined to the core region in the low-intensity case to a strong leakage in the high-intensity case. A possible location of such a signal mode for the specific example will be for $\Lambda/\lambda_2=2.2$, where the free space wave number $k_2=2\pi/\lambda_2$, $\lambda_2$ being the signal wavelength. If the control mode—at wavelength $\lambda_1$—has to be able to maintain the high intensity (and thereby modify the optical waveguide as desired), it is for the specific example essential that the control mode stay guided. This means that the control mode should be chosen for a free space wave number $k_1$, which is so much smaller than that of the signal mode that the mode solution of the control mode will stay within the band gap (in this example a value of $\Lambda/\lambda_1=1.6$ could be a possibility). In this example, we have, therefore, found that the signal wavelength ($\lambda_2$) and control wavelength ($\lambda_1$) preferable obey the relation $\lambda_1>\lambda_2$.

For the fibre of this specific example, a signal wavelength, $\lambda_2$, of 1.55 µm would demand a centre-to-centre spacing of two nearest air holes in the cladding of about 3.5 µm, and a control wavelength, $\lambda_1$, of about 2.0 µm. However, a shorter control wavelength (closer to the signal wavelength) may also be obtained for other designs than the one discussed above. For example could the amount of non-linear material be increased or decreased in order to change the high-intensity cut-off of the signal wavelength—thereby allowing to push or expel the control signal wavelength against or away from the signal wavelength. It is, however, often desired to have the signal and control wavelength closely spaced, hence to have a spacing of less than 500 nm such as less than 300 nm (for example at 1.3 µm and at 1.5 µm), or even closer as for wavelength division multiplexing systems—where a spacing as small as 10 nm is desired. For other applications, it is required that the signal wavelength is shorter than 1.55 µm, e.g., such as around 800 nm, hence preferred embodiments cover fibres with a centre-to-centre spacing of nearest air holes smaller than 3.5 µm, such as around 3.0 µm, or such as around 2.0 µm, or even smaller.

It should be noted that in the described example, the upper end of the guided mode solutions with regard to dimensions of the PBG structure was chosen, However, as the technology is further developed, a development towards high precision control of even very small structure periodicities are expected, and in this case it will also become feasible to use the other end of the photonic band gap, and hereby inverting the relation between wavelengths of signal and control light.

FIG. 6 furthermore illustrates this relation for the above-discussed fibre design, when the fibre is operated in the low-frequency range. The figure allows to correctly design the dimensions of the fibre. If, for example, the signal wavelength is desired to be at 1.55 µm, then the centre-to-centre spacing of two-nearest air holes should be about 1.0 µm—and the control wavelength should be around 1.3 µm. For other applications, it is required that the signal wavelength is shorter—such as around 800 nm—hence, the centre-to-centre spacing of nearest air holes should be even smaller than 1.0 µm.

Further optimisations of the fibres according to the present invention may be obtained by varying the fraction of air holes and/or non-linear material. For certain applications, a large separation of the two wavelengths is desired—whereas for other applications, a small separation is desired. Independent tuning of the filling fractions of holes and non-linear material provides a large flexibility for designing fibres for specific applications.

Yet another aspect of the invention is that in the case of both signal and control modes being located such that both falls outside the band gap of the modified waveguide (the high-intensity case), we will see a different operation of the device. In this case, the control mode shifting from low-intensity to high-intensity will lead to the leakage of the signal mode, but also to the leakage of the control mode itself. This can result in much lower local mode field intensity for the leaky mode, and, consequently, the waveguide will switch back to the low-intensity case. As this happens, the control mode intensity will again reach its guided form and the threshold for modifying the non-linear material will once again be reached, where after the whole procedure repeats itself. This means in other words that we have obtained an optical oscillator operating by a frequency given by the response time of the non-linear material and (to a minor degree) the guided mode properties and the waveguide properties of the photonic band gap fibre.

Figure 7:
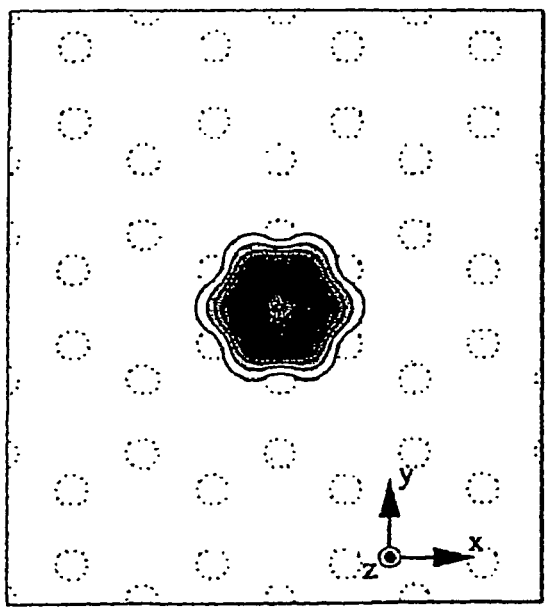
FIG. 7 shows the mode field distributions for a honeycomb-structured photonic bandgap fibre design for low intensity control power levels as well as for high intensity power levels.
Figure 7:
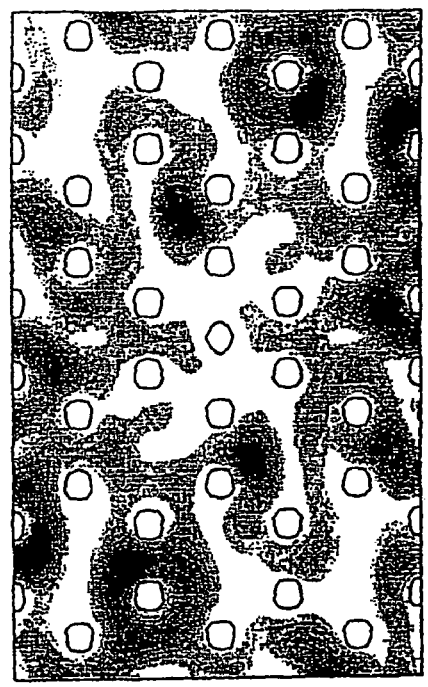

To illustrate the principle of the honeycomb-structured PBG waveguide further, we have in FIG. 7 shown the calculated mode fields for a structure with the air hole diameter, d, given in relation to the hole spacing, $\Lambda$, as $d/\Lambda=0.4$, i.e., the air-filling fraction for the honey-comb cladding design is 10%.

III. All-Optical Wavelength Converter

After having described, how the principle of optically controlled waveguiding in a micro-structured fibre/waveguide may be realised according to the present invention, we will address the use of such waveguides as wavelength conversion elements by drawing forward some examples of how to place them in proper optical set-ups.

Figure 8:
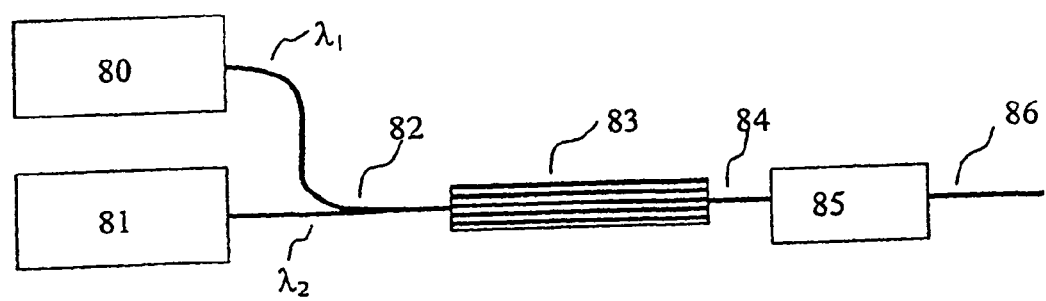
FIG. 8 illustrates a schematic diagram of a micro-structured wavelength converting waveguide device in accordance with the invention, in which the wavelength to be encoded and the encoding wavelength are co-propagating.

In FIG. 8, a schematic diagram of a micro-structured wavelength converting waveguide device in accordance with the invention is shown. Here, the encoding wavelength (the wavelength, $\lambda_1$, which carries the encoded information) is provided from a device (80) as shown at FIG. 8. It should be noted that this encoding device could be any kind of optical light source (e.g., a laser or light emitting diode) in combination with a proper modulating device. The element (80), as indicated on the illustration may also represent an optical transmission line—as a part of an optical communication system—and in this case it may even include optical amplifiers, dispersion manipulating devices etc. to provide the desired signal quality. FIG. 8 further shows another light source (81) operating at wavelength $\lambda_2$. This light source may for simplicity be considered as a continuous-wave (CW) source, to which the encoded information has to be converted by the wavelength converting device. Also in this case may the element (81) include amplifiers. The light from the two light sources (80) and (81) are guided by optical waveguides (e.g., optical fibres) to a combining device (82) (for example a dicroic coupler) from which the light is guided to the wavelength converting device (83), including a micro-structured section with features filled with a non-linear material according to the invention. We note that in the example presented in FIG. 8, the wavelength to be encoded, $\lambda_2$, and the encoding wavelength, $\lambda_1$, are co-propagating. For certain applications it will, therefore, be necessary to include an optical filtering (85) after the waveguide (84), through which the optically processed signal is guided after wavelength conversion. Such cases may for instance be situations where a part of the encoding wavelength is coupled out through the waveguide (84), and where it further would be a disadvantage for the optical system, that this wavelength entered the following transmission link or optical network. After the filtering device (85), the signal encoded on wavelength $\lambda_2$ is now transmitted through the waveguide (86), which also may include a transmission link, a part of an optical network etc.

Figure 9:
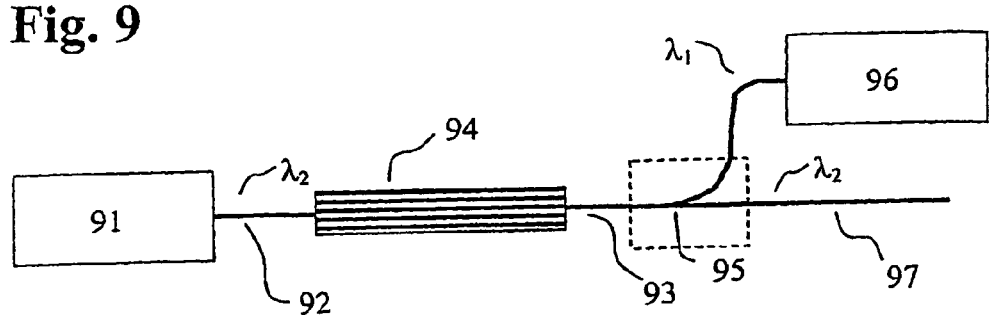
FIG. 9 illustrates a schematic diagram of a micro-structured wavelength converting waveguide device in accordance with the invention, in which the wavelength to be encoded and the encoding wavelength are counter-propagating.

Yet another example of a wavelength-converting device is outlined in FIG. 9, which illustrates a counter-propagating configuration for encoding and encoded wavelengths, respectively. The example shown in FIG. 9 includes an optical light source (91) (e.g., a laser or a light emitting diode)—including the necessary amplifying and filtering components—from which a CW optical field centred around the wavelength $\lambda_2$ is emitted through a waveguide (92), which for example may be an optical fibre, a planar optical device, or a system of bulk optical components. The waveguide (92) is connected to one end of the micro-structured optical waveguide (94) that includes features filled with non-linear material, and operating as indicated by the previous examples. In contrast to the previously described converter design, the encoding wavelength, $\lambda_1$, is here counter-propagating with respect to the first mentioned wavelength $\lambda_2$. The encoding wavelength is emitted from the light source (96) and guided into the non-linear optical device (94) through a coupler (95) (e.g., a dicroic coupler) and the waveguide (93). It should be noted that the waveguide (93), which here operates as the out-coupling waveguide for wavelength $\lambda_2$ also may be a combination of bulk optical components, but preferably will be a fibre or a planar waveguide component. After the encoding on wavelength $\lambda_2$ has taken place, the wavelength-converted signal is now guided through the out-coupling section (93) through the coupler (95) and onto the transmission line (97) or other part of the optical system in which the wavelength converter is an element. The counter-propagating set-up as described in FIG. 9, has the advantage of allowing a better wavelength separation between $\lambda_1$ and $\lambda_2$.

It should be noted that the configurations described in FIG. 8 and FIG. 9 also have the possibility of operating as optically controlled routers. In these cases, the control wavelength $\lambda_1$, would either be switched on or off, and depending on the optical intensity of this control wavelength, the wavelength $\lambda_2$, which in such cases then would carry the signal information, would be either guided through the non-linear component or attenuated. Such a device will be even more efficient, if the two-core device—as indicated in FIG. 3—is combined with a coupling device that allows the output bit stream to be switched between waveguide paths.

IV. Alternative Realisations of Optically Controlled Non-Linear Waveguiding Devices.

In the previous sections, we have described a number of examples according to the present invention of optically controlled non-linear waveguiding devices and their applications within switching and optical wavelength conversion. In these examples it has been natural to assume that all optical fields have been propagating predominantly in the same direction or in opposite directions. However, as the optically controlled waveguide according to this invention provides a highly sensitive functionality (i.e., low powers and short waveguide lengths are needed to obtain the described functionality), it will be an obvious possibility to provide separate propagating directions for different wavelengths. This will clearly lead to an increased flexibility in the design of future optical components according to the described invention.

Figure 10:
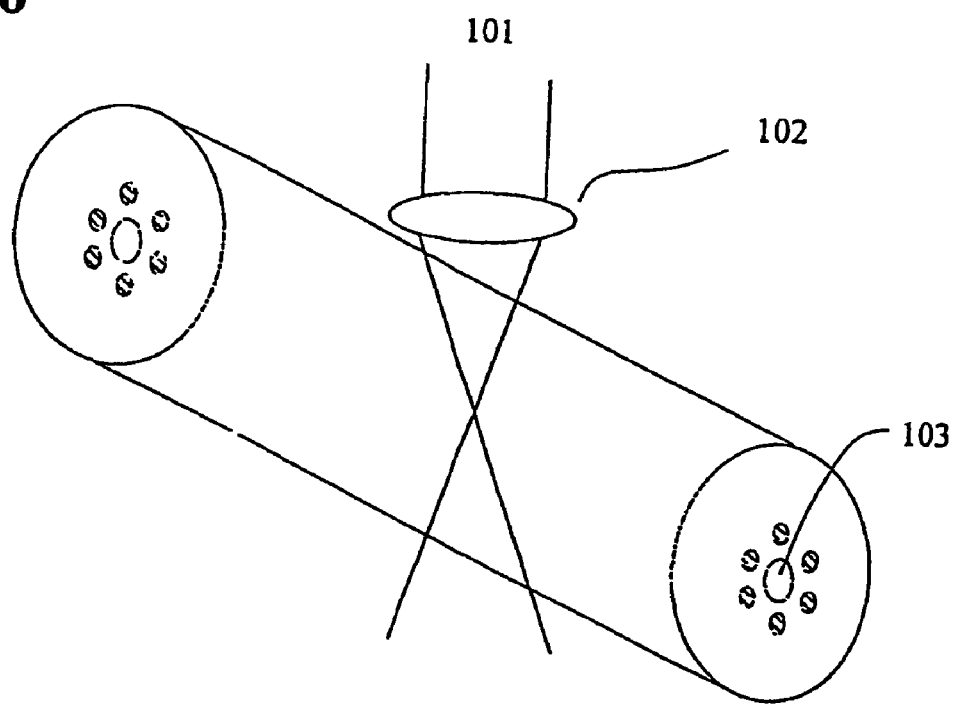
FIG. 10 shows a schematic illustration of micro-structured wavelength converting waveguide device in which the encoding wavelength (or control wavelength) is illuminating the micro-structured fibre from the side.

A first example of such a separation of optical waveguiding directions between different wavelengths is presented in FIG. 10, where a micro-structured optical fibre containing features filled with non-linear material is illuminated from the side. The side illumination by the control light (101) is provided through a focusing device (102) onto the core region (103). By controlling the intensity of the light (101), the light guiding property of the fibre waveguide core region may be changed, and the previously described properties obtained.

Figure 11:
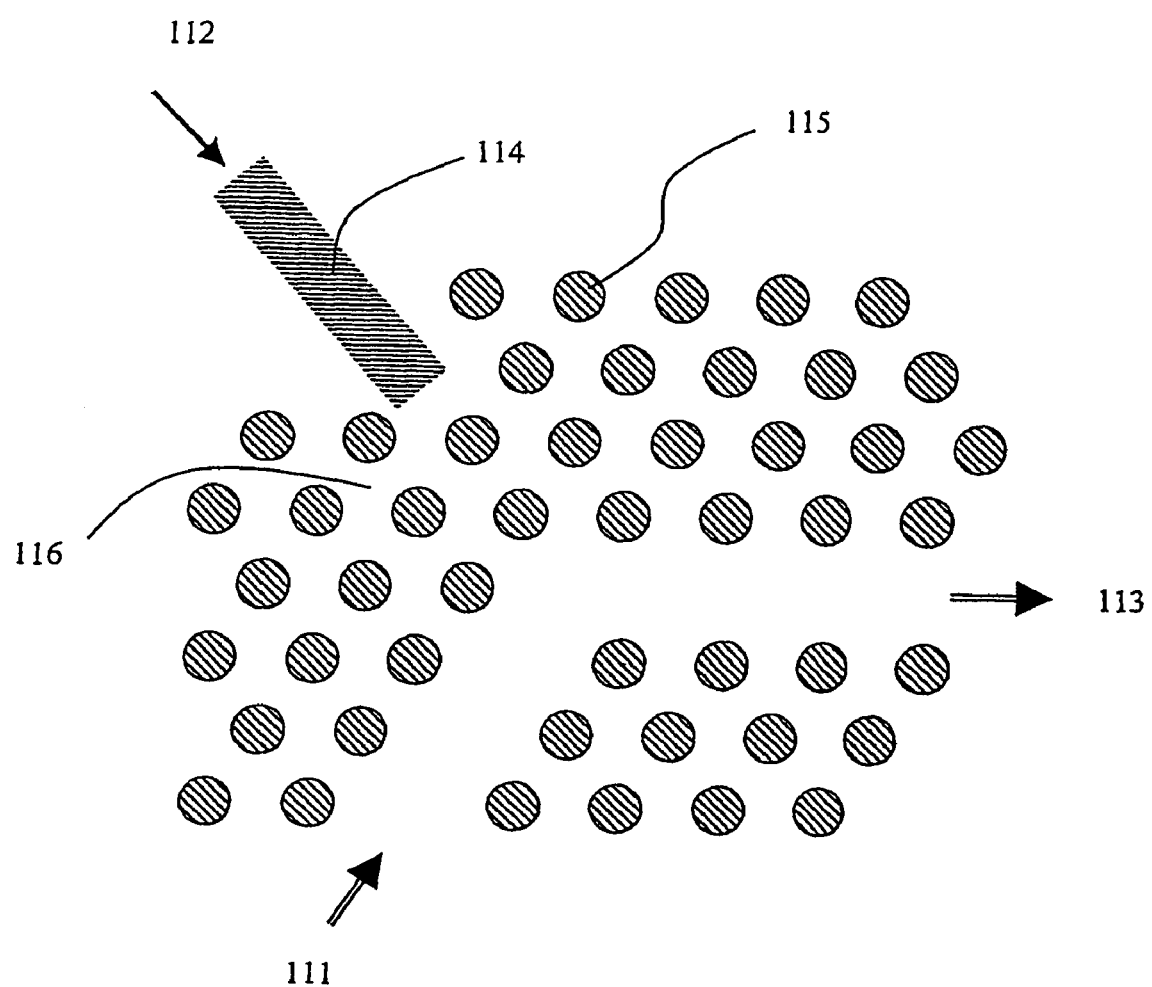
FIG. 11I shows an example of a micro-structured planar waveguide structure in which the optical modes is guided in-plane orthogonal to the elements filled with non-linear material, and allowing for optical control of the waveguiding properties and direction of the light.

A second example of a waveguiding device according to the invention, in which the propagating directions of the involved wavelengths are separated, is shown in FIG. 11. This figure illustrates a top-down view on a planar optical waveguide structure operating by the photonic bandgap principle. As it is well known to those skilled in the art, planar photonic bandgap devices holds the potential of obtaining much smaller integrated optical waveguide component sizes than possibly using present days technology. One of the reasons for this is that very sharp waveguide bends may be realised in planar PBG waveguides, and only a few layers of periodically distributed waveguide features are necessary for obtaining the waveguide effect. It is, therefore, an interesting possibility to be able to optically switch the power in such waveguide devices. In the schematic illustration in FIG. 11, the signal is propagating (in the plane of the figure) with a predominant direction indicated by the arrow (111). For low intensities, and for low intensities of the control light (112), the signal will be guided around the sharp bend and exit in the direction indicated by the arrow (113). However, if the periodically placed features (115) contains optically non-linear material as previously described, then it will be possible to modify the refractive index of these features and thereby change the bandgap properties given by the periodically placed features and the background material (116), in which they are placed. If we—in analogy to the example described in FIG. 6—move from a situation, where the signal mode is guided to a leaky mode situation, the output at (113) will be strongly affected by the intensity of the control light entering through the waveguide (114). Note that the waveguide for the control light may be a classical TIR based waveguide or even top illumination of the planar waveguide using micro-lens systems of fibre coupling. It should also be noted that the type of planar waveguide devices in which this effect may be used are much broader than indicated by this example, since coupling between a multitude of waveguide cores, or optical control of resonators are among the unique possibilities of the principle described in this invention.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An optical wavelength conversion device comprising:
   a micro-structured optical waveguide including sections that have a non-linear material with an index of refraction which changes as a non-linear function of light intensity, said waveguide including a light guiding core region, and said waveguide being dimensioned for providing spatial overlap between the sections filled with the non-linear material and light propagating within the waveguide;

a first optical light source for introducing light into said waveguide in a mode guided along the core;

a second intensity modulated light source for introducing encoding light into said waveguide in such a manner that it illuminates the sections filled with a non-linear material, said second light source having an intensity modulation sufficient to change the refractive index of the non-linear material by an amount sufficient to encode or modulate the light from the first optical light source accordingly, said encoding taking place through the effect of leaking light from the first light source from the inside of the guiding core to the outside of the guiding core.

2. A micro-structured optical waveguide having an axial direction and a cross section substantially perpendicular to said axial direction, the micro-structured optical waveguide comprising sections that are elongated in said axial direction and which include a non-linear material having an index of refraction which changes as a non-linear function of light intensity, said waveguide including a light guiding core region that is elongated in the waveguide axial direction and has a diameter larger than 2 microns, and said waveguide being dimensioned for providing spatial overlap between the sections filled with the non-linear material and the light propagating within the waveguide, said waveguide further including a cladding zone to which the light may be leaking at high intensities, an inner boundary of said cladding zone being placed at a distance from the core centre which is larger than 0.75 times the core diameter.

3. A micro-structured optical waveguide having an axial direction and a cross section substantially perpendicular to said axial direction, the micro-structured optical waveguide comprising sections that are elongated in said axial direction and which include a non-linear material having an index of refraction which changes as a non-linear function of light intensity, said waveguide including a light guiding core region that is elongated in the waveguide axial direction and surrounded by a cladding region, and said waveguide being dimensioned for providing spatial overlap between the sections filled with the non-linear material and the light propagating within the waveguide, the waveguide core region being realised with a lowered refractive index compared to the refractive index surrounding the core, and said waveguide including a multiplicity of spaced apart cladding-structure features that are elongated in the waveguide axial direction and disposed in the cladding region surrounding said core region, the waveguide cladding structure features including air holes with a centre-to-centre spacing of nearest air holes being smaller than 5 $\mu$m.

4. A micro-structured optical waveguide having an axial direction and a cross section substantially perpendicular to said axial direction, the micro-structured optical waveguide comprising sections that are elongated in said axial direction and which include a non-linear material having an index of refraction which changes as a non-linear function of light intensity, said waveguide including a light guiding core region that is elongated in the waveguide axial direction and surrounded by a cladding region, and said waveguide being dimensioned for providing spatial overlap between the sections filled with the non-linear material and the light propagating within the waveguide, the waveguide core region being realised with a lowered refractive index compared to the refractive index surrounding the core, and said waveguide including a multiplicity of spaced apart cladding-structure features that are elongated in the waveguide axial direction and disposed in the cladding region surrounding said core region, the waveguide sections that include the non-linear material having a cross-section area which is at least 10% as large as a cross-section area of the cladding-structure features.

5. A micro-structured optical waveguide having an axial direction and a cross section substantially perpendicular to said axial direction, the micro-structured optical waveguide comprising sections that are elongated in said axial direction and which include a non-linear material having an index of refraction which changes as a non-linear function of light intensity, said waveguide including a light guiding core region that is elongated in the waveguide axial direction, and said waveguide being dimensioned for providing spatial overlap between the sections filled with the non-linear material and the light propagating within the waveguide, said dimensioning of said micro-structured optical waveguide being such that the sections that include the non-linear material are placed within a distance from the core centre which is smaller than 10 times the operating wavelength of the light to be guided by said core region.

6. The micro-structured optical waveguide according to claim 5, wherein the core region is surrounded by a cladding region.

7. The micro-structured optical waveguide according to claim 6, wherein the waveguide core region is realised with a lowered refractive index compared to the refractive index surrounding the core, and in which the waveguide includes a multiplicity of spaced apart cladding-structure features that are elongated in the waveguide axial direction and disposed in the cladding region surrounding said core region.

8. A micro-structured optical waveguide according to claim 6, wherein the sections including the non-linear material are voids or channels elongated in the axial direction of the waveguide and arranged in the cladding region surrounding the core region.

9. The micro-structured optical waveguide according to claim 6, wherein the sections including the non-linear material are periodically arranged in the cladding region surrounding the core region.

10. The micro-structured optical waveguide according to claim 5, wherein the waveguide core region is realised with a raised refractive index compared to the refractive index surrounding the core.

11. The micro-structured optical waveguide according to claim 5, wherein the micro-structured optical waveguide is an optical fibre.

12. A The micro-structured optical waveguide according to claim 5, wherein the core region has a diameter larger than 2 microns.

13. A micro-structured optical waveguide having an axial direction and a cross section substantially perpendicular to said axial direction, the micro-structured optical waveguide comprising sections that are elongated in said axial direction and which include a non-linear material having an index of refraction which changes as a non-linear function of light intensity, said waveguide including a light guiding core region that is elongated in the waveguide axial direction and waveguide features that contain a photo-sensitive material in which permanent refractive-index changes may be induced, said waveguide being dimensioned for providing spatial overlap between the sections filled with the non-linear material and the light propagating within the waveguide.

14. A micro-structured optical waveguide having an axial direction and a cross section substantially perpendicular to said axial direction, the micro-structured optical waveguide comprising sections that are elongated in said axial direction and which include a non-linear material having an index of refraction which changes as a non-linear function of light intensity, said waveguide including a light guiding core region that is elongated in the waveguide axial direction and surrounded by a cladding region, and said waveguide being dimensioned for providing spatial overlap between the sections filled with the non-linear material and the light propagating within the waveguide, said waveguide further including a multiplicity of spaced apart cladding-structure features that are elongated in the waveguide axial direction and disposed in the cladding region, the said cladding-structure features predominantly being periodical cladding-structure features.

15. The micro-structured optical waveguide according to claim 14, wherein the cladding-structure features are placed in a close-packed arrangement.

16. The micro-structured optical waveguide according to claim 14, wherein the waveguide cladding structure features are air holes.

17. An optical switching device comprising:
a micro-structured optical waveguide having an axial direction and a cross section substantially perpendicular to said axial direction, the micro-structured optical waveguide including sections that have a material with an index of refraction which changes as a non-linear function of light intensity, said waveguide including a light guiding core region, and said waveguide being dimensioned for providing spatial overlap between the sections filled with a non-linear material and light propagating within the waveguide;

a first optical light source for introducing light into said waveguide in a mode guided along the core;

a second variable intensity light source for introducing light into said waveguide in such a manner that it illuminates the sections filled with a non-linear material, said second light source having an intensity variation sufficient to change the refractive index of the non-linear material by an amount sufficient to induce switching of the light from the first optical light source, said switching taking place through the effect of leaking light from the first light source from the inside of the guiding core to the outside of the guiding core.

* * * * *